US006784947B2

(12) United States Patent
Kuramochi et al.

(10) Patent No.: US 6,784,947 B2
(45) Date of Patent: Aug. 31, 2004

(54) IMAGE DISPLAY APPARATUS AND METHOD OF CORRECTING IMAGE ON IMAGE DISPLAY APPARATUS AGAINST INCLINATION BY TERRESTRIAL MAGNETISM

(75) Inventors: Fumito Kuramochi, Kanagawa (JP); Etsuko Morota, Tokyo (JP); Katsuyuki Kurita, Tokyo (JP)

(73) Assignee: Sony Corporation, Tokyo (JP)

( * ) Notice: Subject to any disclaimer, the term of this patent is extended or adjusted under 35 U.S.C. 154(b) by 436 days.

(21) Appl. No.: 09/835,899

(22) Filed: Apr. 16, 2001

(65) Prior Publication Data

US 2001/0030714 A1 Oct. 18, 2001

(30) Foreign Application Priority Data

Apr. 18, 2000 (JP) ..................................... P2000-116855

(51) Int. Cl.[7] .............................. H04N 3/22; H04N 3/26
(52) U.S. Cl. ..................... 348/806; 348/820; 348/807; 348/746; 348/747
(58) Field of Search ................................. 348/806, 807, 348/803, 820, 745, 827, 746, 828, 747; 315/8, 85, 369, 370; 313/433, 437

(56) References Cited

U.S. PATENT DOCUMENTS

| 3,609,445 | A | | 9/1971 | Williams et al. | |
|---|---|---|---|---|---|
| 4,899,082 | A | | 2/1990 | Sands et al. | |
| 4,996,461 | A | * | 2/1991 | Bentley | 315/8 |
| 5,021,712 | A | * | 6/1991 | Sands et al. | 315/8 |
| 5,134,390 | A | * | 7/1992 | Kishimoto et al. | 345/659 |
| 5,168,195 | A | * | 12/1992 | Breidigan et al. | 315/8 |
| 5,521,463 | A | * | 5/1996 | Ogawa et al. | 313/440 |
| 5,604,403 | A | * | 2/1997 | Levy et al. | 315/8 |
| 5,642,175 | A | * | 6/1997 | Hirakawa | 348/806 |
| 5,705,899 | A | * | 1/1998 | Penninga et al. | 315/368.26 |
| 5,847,511 | A | * | 12/1998 | Lee | 315/8 |
| 6,480,242 | B1 | * | 11/2002 | Okada et al. | 348/807 |

* cited by examiner

Primary Examiner—Michael H. Lee
Assistant Examiner—Jean W. Désir
(74) Attorney, Agent, or Firm—Frommer Lawrence & Haug LLP; William S. Frommer; Dennis M. Smid

(57) ABSTRACT

An image display apparatus which employs a cathode ray tube displays, when an image displayed on a screen of the cathode ray tube is to be corrected against an inclination caused by the terrestrial magnetism, a reference for correction is displayed on the screen of the cathode ray tube so that correction current appropriate for correction of the image against the inclination caused by the terrestrial magnetism can be obtained in a short time.

8 Claims, 5 Drawing Sheets

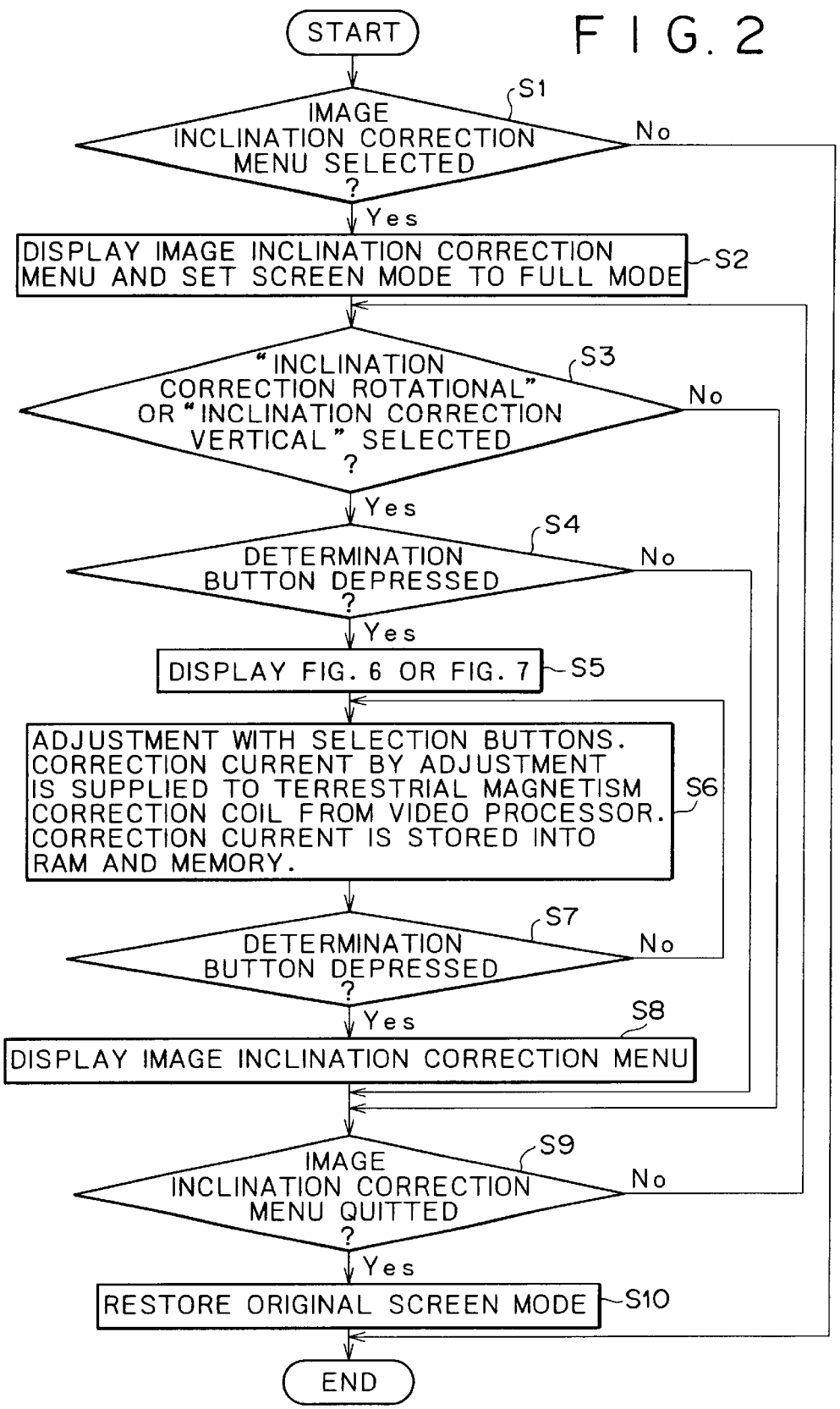

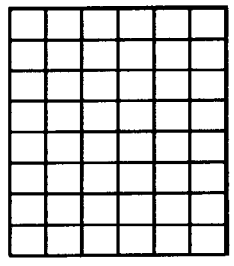
FIG.3A
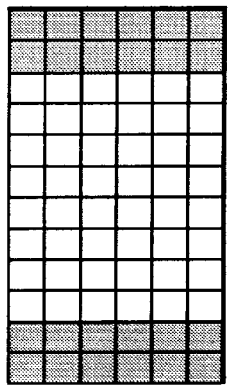
FIG.3C WIDE ZOOM
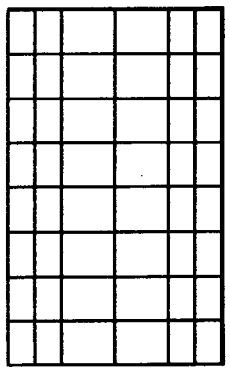
FIG.3D NORMAL
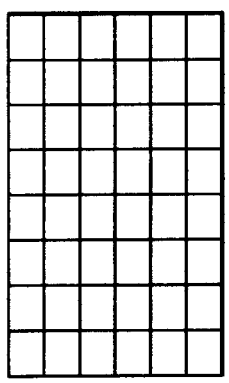
FIG.3B FULL
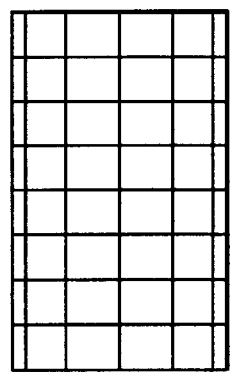
FIG.3E ZOOM
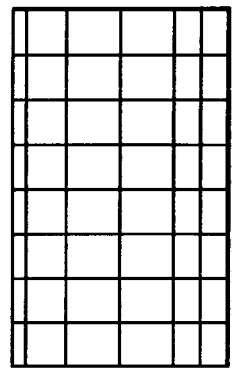
FIG.3F CHARACTER SUPERIMPOSED

ROTATIONALLY CORRECTED SCREEN

VERTICALLY CORRECTED SCREEN

IMAGE DISPLAY APPARATUS AND METHOD OF CORRECTING IMAGE ON IMAGE DISPLAY APPARATUS AGAINST INCLINATION BY TERRESTRIAL MAGNETISM

BACKGROUND OF THE INVENTION

This invention relates to an image display apparatus which employs a cathode ray tube and a method of correcting an image displayed on an image display apparatus which employs a cathode ray tube against an inclination caused by the terrestrial magnetism.

Generally, an image display apparatus which employs a cathode ray tube such as a television receiver is influenced by a magnetic field of the terrestrial magnetism or the like depending upon the place or the direction at or in which it is placed such that the image on the screen of the cathode ray tube is displaced upwardly or downwardly or is inclined or rotated.

Particularly, television broadcasting at present provides an image principally of the aspect ratio of 4:3, and when a television broadcast of the aspect ratio of 4:3 is received by a wide television receiver of another aspect ratio of 16:9 and the image of the television broadcast is expanded horizontally so that it is displayed as a wide image on the wide television receiver, the image suffers from noticeable displacement in a rotational direction by a magnetic field provided by the terrestrial magnetism.

Conventionally, in such an image display apparatus which employs a cathode ray tube as described above, correction current is supplied to a terrestrial magnetism correction coil provided at a boundary location between a funnel portion and a neck portion of the cathode ray tube to correct the image on the screen of the cathode ray tube so that it may not suffer from an inclination caused by the magnetic field of the terrestrial magnetism, that is, from being displaced upwardly or downwardly or from being rotated.

Conventionally, however, the inclination of the image is adjusted while a reference video of a television broadcast being broadcast at present for allowing correction of the image against an inclination caused by the terrestrial magnetism is displayed on the screen of the cathode ray tube of the television receiver. Therefore, good correction current cannot be obtained until it is waited that the reference video is displayed. Consequently, there is a disadvantage that much time is required for adjustment to obtain good correction current.

The adjustment for obtaining correction current is performed with reference to a portion of the video being broadcast which is considered to be horizontal. This is disadvantageous in that it is difficult to obtain optimum correction current.

SUMMARY OF THE INVENTION

It is an object of the present invention to provide an image display apparatus employing a cathode ray tube and an image correction method for the image display apparatus by which appropriate correction current used for correction of an image on the cathode ray tube against an inclination caused by the terrestrial magnetism can be obtained in a short time.

In order to attain the object described above, according to an aspect of the present invention, there is provided an image display apparatus which employs a cathode ray tube, comprising means for issuing a correction instruction to correct an image displayed on a screen of the cathode ray tube against an inclination and/or a vertical displacement caused by the terrestrial magnetism, and means operable in response to the correction instruction for causing a reference for correction to be displayed on the screen of the cathode ray tube.

With the image display apparatus, when a display image is to be corrected against an inclination caused by the terrestrial magnetism, the reference for correction is displayed on the screen of the cathode ray tube, and the display image is corrected against the inclination caused by the terrestrial magnetism with reference to the display of the reference for correction by the user. Consequently, the image display apparatus is advantageous in that the user can obtain correction current with which the display image can be corrected appropriately against the inclination caused by the terrestrial magnetism in a short time.

Preferably, the means operable in response to the correction instruction causes the image on the screen of the cathode ray tube to be adjusted so that the image is displayed entirely with a uniform compression ratio. With the image display apparatus, when the display image is to be corrected against the inclination caused by the terrestrial magnetism, it is displayed entirely with a uniform compression ratio. Consequently, the correction of the image can be performed under the uniform condition and good correction of the image against the inclination can be achieved.

According to another aspect of the present invention, there is provided a method of correcting an image displayed on an image display apparatus which employs a cathode ray tube against an inclination and/or a vertical displacement caused by the terrestrial magnetism, comprising the steps of displaying, in response to a correction instruction to correct the image against an inclination and/or a vertical displacement caused by the terrestrial magnetism, a reference for correction on the screen of the cathode ray tube, and correcting the image against the inclination and/or the vertical displacement caused by the terrestrial magnetism with reference to the display of the reference for correction.

With the method of correcting an image displayed on the image display apparatus, when a display image is to be corrected against an inclination caused by the terrestrial magnetism, the reference for correction is displayed on the screen of the cathode ray tube first, and then the display image is corrected against the inclination caused by the terrestrial magnetism with reference to the display of the reference for correction by the user. Consequently, the user can obtain correction current with which the display image can be corrected appropriately against the inclination caused by the terrestrial magnetism in a short time.

Preferably, the correction of the image against the inclination and/or the vertical displacement caused by the terrestrial magnetism is performed after an image size on the screen of the cathode ray tube is adjusted so that the image is displayed entirely with a uniform compression ratio. With the method of correcting an image displayed on the image display apparatus, when the display image is to be corrected against the inclination caused by the terrestrial magnetism, it is displayed entirely with a uniform compression ratio. Consequently, the correction of the image can be performed under the uniform condition and good correction of the image against the inclination can be achieved.

The above and other objects, features and advantages of the present invention will become apparent from the following description and the appended claims, taken in con-

BRIEF DESCRIPTION OF THE DRAWINGS

FIG. 2 is a flow chart illustrating operation of the image display apparatus of FIG. 1;

FIGS. 3A to 3F are diagrammatic views illustrating several display modes of an image display apparatus;

DESCRIPTION OF THE PREFERRED EMBODIMENT

Figure 1:
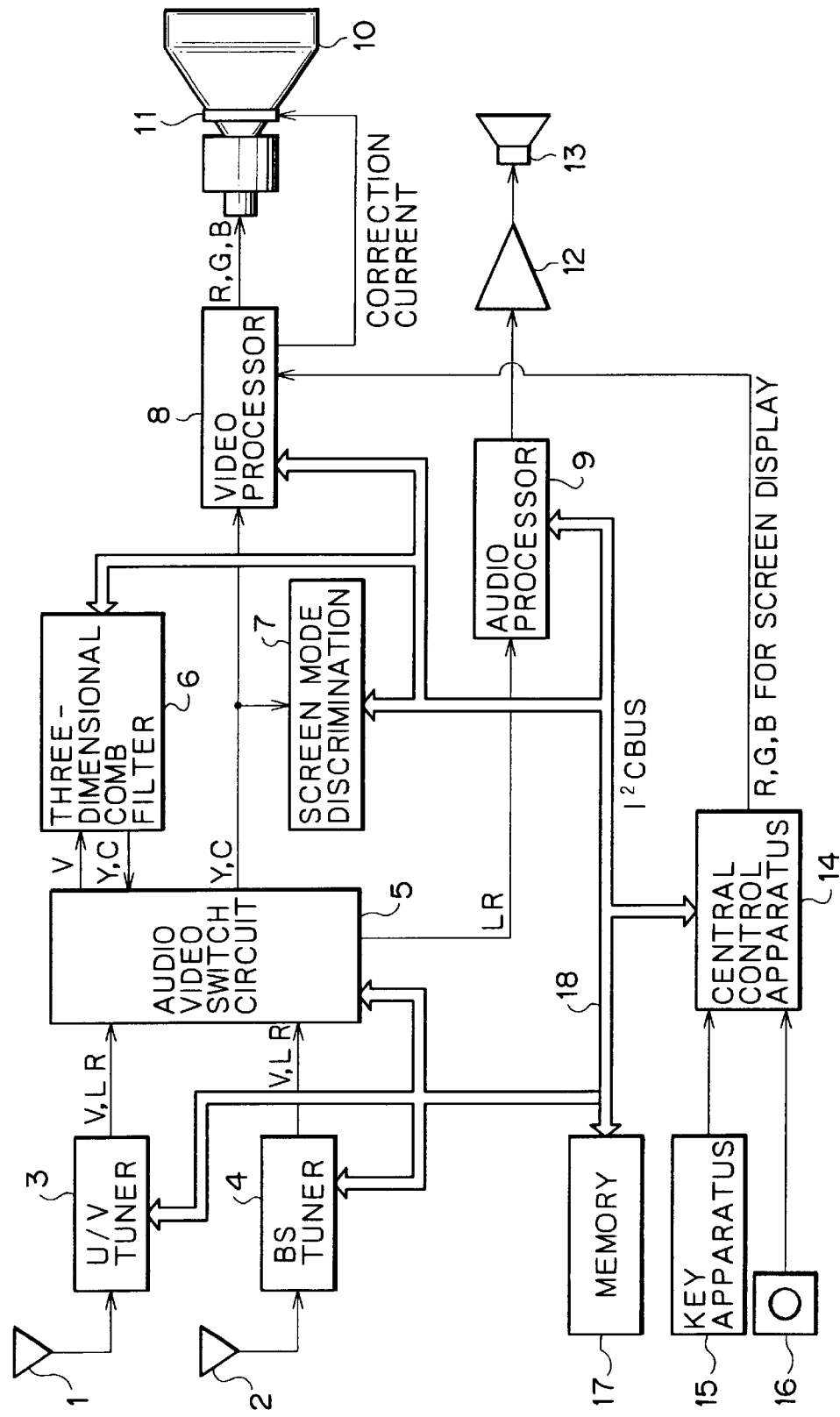
FIG. 1 is a block diagram showing an image display apparatus to which the present invention is applied.

Referring first to FIG. 1, there is shown a wide television receiver to which the present invention is applied. The television receiver shown is connected to a U/V (UHF/VHF) antenna 1 which can receive a television broadcast of the UHF band and a television broadcast of the VHF band. The UHF band and VHF band television broadcasts received by the U/V antenna 1 are supplied to a U/V tuner 3.

The U/V tuner 3 is controlled by a central control apparatus 14 formed from a micro computer over a bus 18 formed from, for example, an $I^2C$ bus 18, and selects a channel designated by a key apparatus 15 or a remote control apparatus 16 connected to the central control apparatus 14. Then, the U/V tuner 3 supplies a video signal V and audio signals L, R of the selected channel to an audio video switch circuit 5.

Also a satellite antenna 2 for receiving a satellite broadcast is connected to the wide television receiver. The satellite antenna 2 supplies a received satellite broadcast signal to a BS (broadcasting satellite) tuner 4.

The BS tuber 4 is controlled by the central control apparatus 14 over the bus 18, and selects a channel designated by the key apparatus 15 or the remote control apparatus 16 and supplies a video signal V and audio signals L, R of the selected channel to the audio video switch circuit 5.

The video signal V received from the U/V tuner 3 or the BS tuner 4 by the audio video switch circuit 5 is supplied to a three-dimensional comb filter 6, by which it is decomposed into a brightness signal Y and a color signal C. The brightness signal Y and the color signal C are supplied to the audio video switch circuit 5. The three-dimensional comb filter 6 operates in accordance with an instruction received from the central control apparatus 14 through the bus 18.

The audio video switch circuit 5 is controlled in accordance with an instruction received from the central control apparatus 14 through the bus 18, and supplies the brightness signal Y and the color signal C of the designated channel to a video processor 8. Further, the audio video switch circuit 5 supplies the audio signals L, R of the designated channel received from the U/V tuner 3 or the BS tuner 4 to an audio processor 9.

The brightness signal Y received from the three-dimensional comb filter 6 by the audio video switch circuit 5 is supplied to a screen mode discrimination circuit 7 provided for discriminating an image size. The screen mode discrimination circuit 7 fetches the brightness signal Y decomposed by the three-dimensional comb filter 6 and discriminates an optimum screen mode from an identification signal (for example, EDTV 2) of a screen mode (image size) which is superposed on a vertical blanking period of the brightness signal Y or a no-signal portion at an upper or lower portion of the screen (dark belt portion). The screen mode information discriminated by the screen mode discrimination circuit 7 is transmitted to the central control apparatus 14 over the bus 18.

Such five different screen modes as shown in FIGS. 3B to 3F are available as the screen mode of a wide television receiver whose aspect ratio of the screen is 16:9 when it receives a television broadcast whose aspect ratio of the screen is 4:3 as seen in FIG. 3A. One of the screen modes is selected automatically or by a manual operation.

FIG. 3B schematically shows a screen display of a full mode wherein the image shown in FIG. 3A is expanded horizontally until the aspect ratio may be 16:9 so that the image may be displayed widely in the full size. FIG. 3C shows a screen display of a wide zoom mode wherein the image of FIG. 3A is expanded so that it may be displayed widely with upper and lower portions compressed while a central portion in the vertical direction is not compressed. FIG. 3D shows a screen display of a normal mode wherein the image is displayed as it is with the aspect ratio of 4:3. FIG. 3E shows a screen display of a zoom mode wherein the image is displayed widely with a central portion thereof expanded. FIG. 3F shows a screen display of a character superimposition mode wherein the image in the zoom mode of FIG. 3E is compressed at a lower portion thereof so that, for example, a caption of a movie can be indicated.

The video processor 8 produces signals of red (R), green (G) and blue (B) to be supplied to a color cathode ray tube 10 from the brightness signal Y and the color signal C supplied thereto from the audio video switch circuit 5. Further, the video processor 8 performs controlling of a picture and brightness, correction against distortion of an image, change of a compression ratio (screen mode) of a screen, and terrestrial magnetism correction in accordance with an instruction received through the bus 18 from the central control apparatus 14 and originating from the key apparatus 15 and the remote control apparatus 16.

The terrestrial magnetism correction in the wide television receiver of the present embodiment is performed by the video processor 8 which supplies correction current which is hereinafter described to a terrestrial magnetism correction coil 11 provided at a boundary location between a neck portion and a funnel portion of the color cathode ray tube 10.

The red (R), green (G) and blue (B) signals for image display produced by the central control apparatus 14 are supplied to the video processor 8. The red (R), green (G), and blue (B) signals for image display received by the video processor 8 are supplied to the color cathode ray tube 10 in accordance with an instruction received from the central control apparatus 14 through the bus 18.

The audio signals L, R received by the audio video switch circuit 5 are supplied to the audio processor 9. The audio processor 9 adjusts the sound volumes, the balance and the tone qualities of the audio signals L, R in accordance with an instruction received from the central control apparatus 14 through the bus 18 and originating from the key apparatus 15, remote control apparatus 16 or the like, and supplies the adjusted audio signals L, R to a speaker 13 through an amplification circuit 12.

A memory 17 is connected to the central control apparatus 14 by the bus 18. The memory 17 is formed from a non-volatility memory.

Figure 4:
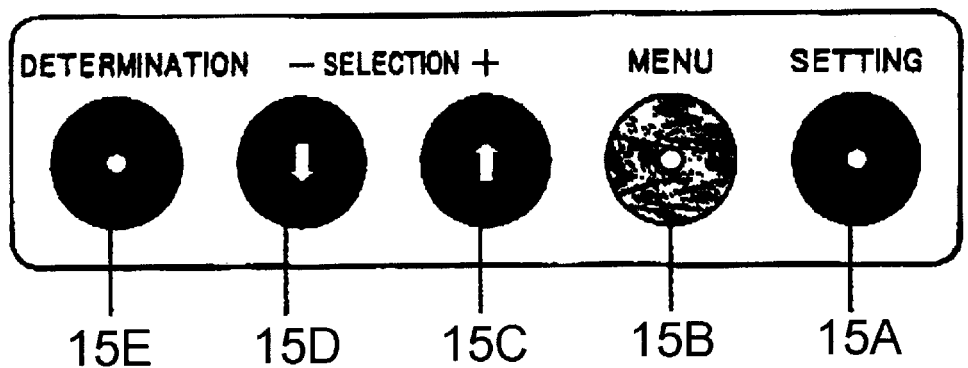
FIG. 4 is a schematic view showing a key apparatus shown in FIG. 1.

Referring to FIG. 4, the key apparatus 15 of the wide television receiver includes a setting button 15a, a menu button 15b, a selection+button 15c, a selection−button 15d, and a determination button 15e.

The wide television receiver corrects a display image against an inclination caused by the terrestrial magnetism in such a manner as seen in FIG. 2 and FIGS. 4 to 7. In order to correct an image on the wide television receiver shown in FIG. 1 against an inclination caused by the terrestrial magnetism, a user will operate the menu button 15b. As a result, a menu screen received from the central control apparatus 14 is displayed on the screen of the color cathode ray tube 10.

Then, the user will operate the setting button 15a to select an image inclination correction menu in step S1. When the image inclination correction menu is selected, such an image inclination correction menu as shown in FIG. 5 is displayed on a screen 10a of the color cathode ray tube 10 and the screen mode of the color cathode ray tube 10 is set to the full mode of the image size with which an image is displayed entirely with a uniform compression ratio as seen in FIG. 3B in step S2.

If the image inclination correction menu is not selected in step S1, then the correction of a display image against an inclination by the terrestrial magnetism is ended.

Figure 5:
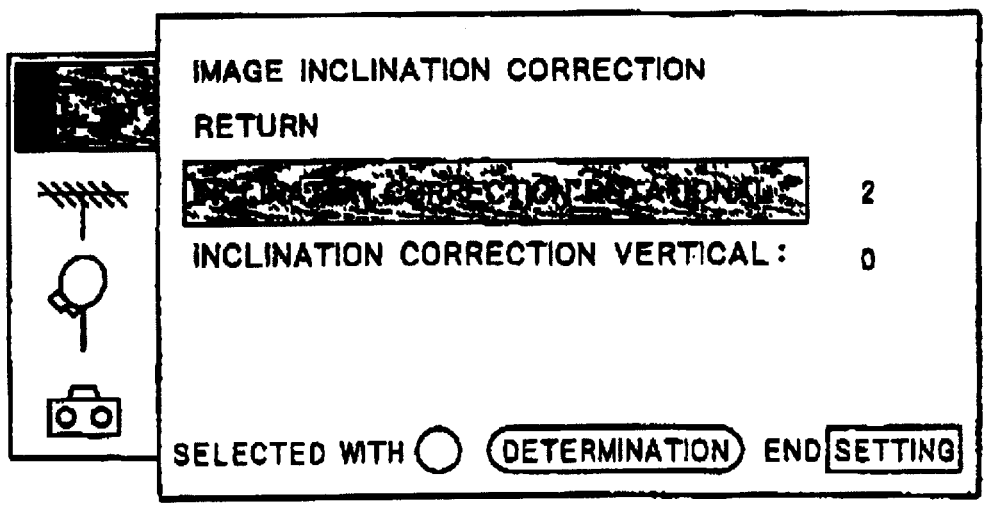
FIG. 5 is a schematic view showing an image inclination correction menu used in the image display apparatus of FIG. 1.
Figure 6:
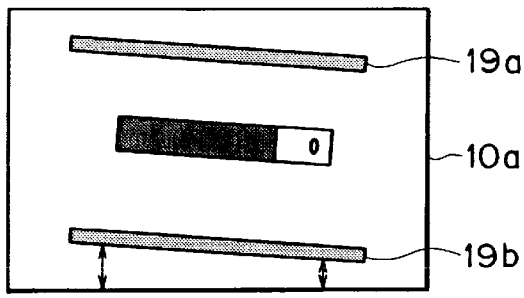
FIG. 6 is a schematic view illustrating correction of a display image displayed on the image display apparatus of FIG. 1 by rotation.

In the wide television receiver of the present embodiment, the correction of a display image against an inclination caused by the terrestrial magnetism can be performed as [inclination correction rotational] and [inclination correction vertical] as seen in FIG. 5. When one of them is to be selected, a cursor will be moved by operation of the selection+button 15c or the selection−button 15d to select the [inclination correction rotational] or [inclination correction vertical] in step S3. Then, if the determination button 15e is operated in step S4, then, for example, if the [inclination correction rotational] has been selected, such a reference image for correction received from the central control apparatus 14 as shown in FIG. 6 is displayed on the screen 10a of the color cathode ray tube 10. On the other hand, for example, if the [inclination correction vertical] has been selected, then such a reference image for correction received from the central control apparatus 14 as shown in FIG. 7 is displayed on the screen 10a of the color cathode ray tube 10 in step S5.

Figure 7:
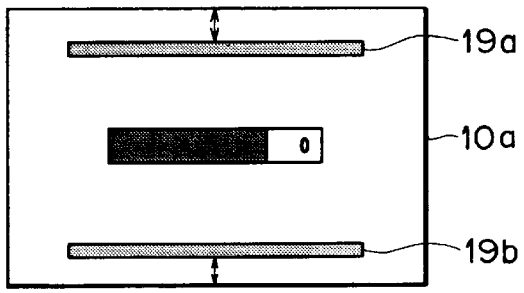
FIG. 7 is a similar view but illustrating correction of a display image displayed on the image display apparatus of FIG. 1 by upward or downward movement.

In the wide television receiver of the present embodiment, if the display image is to be corrected against an inclination caused by the terrestrial magnetism, then bar images 19a and 19b are displayed at predetermined positions of upper and lower portions of the screen 10a of the color cathode ray tube 10 as a reference for correction in the full mode as seen in FIG. 6 or 7.

Then, the user will use the selection+button 15c or the selection−button 15d to correct the display image against an inclination by the terrestrial magnetism while observing the screen 10a in step S6. In this instance, when the "inclination correction rotational" is to be performed, the selection+ button 15c or the selection−button 15d is operated for the adjustment. At this time, in the wide television receiver of the present embodiment, the display image can be adjusted among 15 different amounts of a range between −7 and +7 as represented by the value of the screen 10a.

In this instance, correction current corresponding to the adjusted value is supplied from the video processor 8 to the terrestrial magnetism correction coil 11. The "inclination adjustment rotational" is performed so that the lines of the bar images 19a and 19b of the screen 10a may be horizontal as far as possible.

Further, when the "inclination correction vertical" is to be performed, the selection+button 15c or the selection−button 15d is used for adjustment. At this time, in the wide television receiver of the present embodiment, the display image can be adjusted among 11 different amounts of a range between −5 and +5 as represented by the value of the screen 10a.

In this instance, correction current corresponding to the adjusted value is supplied from the video processor 8 to the terrestrial magnetism correction coil 11. The "inclination adjustment vertical" is performed so that the distances of the bar images 19a and 19b of the screen 10a from the upper and lower end frameworks of the screen 10a may be equal to each other.

Further in this step S6, correction current values corresponding to the values between −7 and +7 and between −5 and +5 of the screen 10a when the "inclination correction rotational" and the "inclination correction vertical" are performed, respectively, are stored into the work RAM and memory 17 of the central control apparatus 14 for each adjustment. After the adjustment, the video processor 8 supplies correction current of a pertaining one of the correction current values stored in the memory 17 to the terrestrial magnetism correction coil 11 in accordance with an instruction received from the central control apparatus 14.

Thereafter, it is discriminated in step S7 whether or not the determination button 15e is operated. If the determination button 15e is operated, then the screen of the image inclination correction menu is displayed again in step S8. However, if the determination button 15e is not operated, then the processing returns to step S6.

When the image inclination correction menu is displayed in step S8, it is discriminated in step S9 whether or not the image inclination correction menu is quitted. In this instance, the image inclination correction menu is quitted when 90 seconds elapse after the image inclination correction menu is displayed, when the menu button 15b is operated again, when the power supply is disconnected or in some other necessary case.

If the image inclination correction menu is quitted, then the screen mode of the color cathode ray tube 10 is returned in step S10 to that before the menu button 15b is operated first, thereby ending the correction of the image against an inclination by the terrestrial magnetism.

The following three cases are possible in restoration of the original screen mode in step S10. First, when originally one of the screen modes illustrated in FIGS. 3B to 3F has been selected manually by the user, then the selected screen mode is established.

Second, if the screen mode has originally been changed automatically in accordance with a screen mode identification signal (for example, EDTV 2) inserted in the vertical blanking period, then the screen mode is automatically changed in accordance with the screen mode identification signal inserted in the vertical blanking period at present.

Third, if the wide television receiver has been set so as to automatically change the screen mode to a screen mode estimated to be optimum for a display image then, then the screen mode is automatically changed to a screen mode estimated to be optimum for a display image at present.

If the image inclination correction menu is not quitted in step S9, then the processing returns to step S3. Further, if none of the "inclination correction rotational" and the "inclination correction vertical" is selected in step S3, then the processing advances to step S9. Also when the determination button 15e is not operated in step S4, the processing advances to step S9.

With the wide television receiver of the present embodiment, in order to correct a display image against an inclination caused by the terrestrial magnetism, the bar images 19a and 19b as a reference for correction are displayed on the screen 10a of the color cathode ray tube 10, and the user will correct the display image against the inclination by the terrestrial magnetism with reference to the bar images 19a and 19b. Consequently, correction current appropriate to correct the display image against the inclination by the terrestrial magnetism can be obtained in a short time.

Further, with the wide television receiver of the present embodiment, when a display image is to be corrected against an inclination caused by the terrestrial magnetism, the image size on the screen 10a of the color cathode ray tube 10 is set to the full mode image size wherein the image is displayed entirely with a uniform compression ratio. Consequently, such correction can be performed under the uniform condition and good correction of an image against an inclination can be achieved.

Figure 8A:
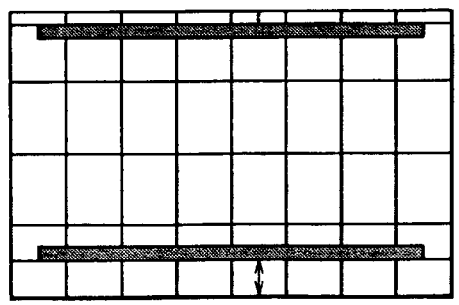
FIGS. 8A and 8B are diagrammatic views illustrating a disadvantage where the display mode of FIG. 3F is used for correction of a display image against an inclination.
Figure 8B:
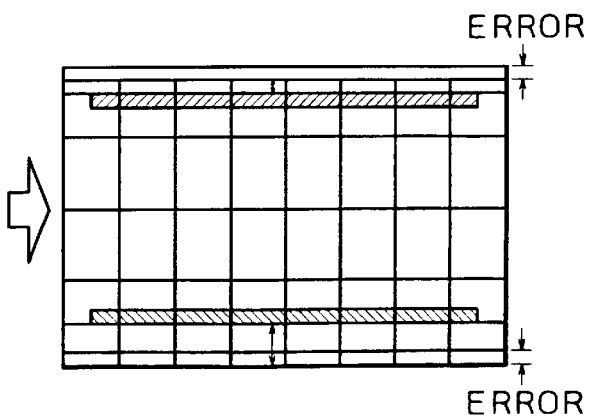

In this connection, if correction of an image against an inclination caused by the terrestrial magnetism is performed in the character superimposition mode wherein a lower portion of a display image of the zoom mode is compressed as shown in FIG. 3F in such a manner as seen in FIG. 8A, then since the vertical compression ratio is different between upper and lower portions of the display image as seen in FIG. 8B, there is a disadvantage that the display image may possibly be corrected at a position higher than the position to which it should originally be corrected as seen in FIG. 8B.

It is to be noted that, while the wide television receiver of the present embodiment uses the bar images 19a and 19b as a reference for correction, they may be replaced by graduations, grids or a like graphic form which can be visually adjusted. Also in this instance, such advantages of the wide television receiver as described above can naturally be achieved.

While a preferred embodiment of the present invention has been described using specific terms, such description is for illustrative purposes only, and it is to be understood that changes and variations may be made without departing from the spirit or scope of the following claims.

What is claimed is:

1. An image display apparatus comprising:
   means including a cathode ray tube having a screen with a first aspect ratio for receiving signals representing images having a second aspect ratio associated therewith, in which said second aspect ratio is different than the first aspect ratio;
   means for issuing a correction instruction to correct an image displayed on said screen of said cathode ray tube against an inclination and/or a vertical displacement caused by terrestrial magnetism;
   means for adjusting the displayed image to any one of a plurality of desired modes including one wherein the image is displayed entirely with a uniform compression ratio; and
   means operable in response to the correction instruction for causing a reference for correction to be displayed on the screen of said cathode ray tube.

2. An image display apparatus according to claim 1, wherein the reference display for correction is a bar image display.

3. An image display apparatus according to claim 1, wherein said first aspect ratio is 16:9 and said second aspect ratio is 4:3.

4. An image display apparatus which employs a cathode ray tube comprising:
   means for issuing a correction instruction to correct an image displayed on a screen of said cathode ray tube against an inclination and/or a vertical displacement caused by terrestrial magnetism; and
   means operable in response to the correction instruction for causing a reference for correction to be displayed on the screen of said cathode ray tube,
   wherein said means operable in response to the correction instruction causes the image on the screen of said cathode ray tube to be adjusted so that the image is displayed entirely with a uniform compression ratio.

5. An image display apparatus according to claim 4, wherein said image display apparatus is a wide television receiver which has an aspect ratio of 16:9.

6. A method of correcting an image displayed on an image display apparatus which employs a cathode ray tube having a screen with a first aspect ratio against an inclination and/or a vertical displacement caused by terrestrial magnetism, comprising the steps of:
   receiving signals representing images having a second aspect ratio associated therewith, in which said second aspect ratio is different than said first aspect ratio;
   adjusting an image displayed on said screen to any one of a plurality of desired modes including one wherein the image is displayed entirely with a uniform compression ratio;
   displaying, in response to a correction instruction to correct the image against an inclination and/or a vertical displacement caused by the terrestrial magnetism, a reference for correction on the screen of said cathode ray tube; and
   correcting the image against the inclination and/or the vertical displacement caused by the terrestrial magnetism with reference to the display of the reference for correction.

7. A method according to claim 6, wherein the reference display for correction is a bar image display with reference to which the image is corrected against the inclination and/or the vertical displacement caused by the terrestrial magnetism.

8. A method of correcting an image displayed on an image display apparatus which employs a cathode ray tube against an inclination and/or a vertical displacement caused by terrestrial magnetism, comprising the steps of:
   displaying, in response to a correction instruction to correct the image against an inclination and/or a vertical displacement caused by the terrestrial magnetism, a reference for correction on the screen of said cathode ray tube; and
   correcting the image against the inclination and/or the vertical displacement caused by the terrestrial magnetism with reference to the display of the reference for correction,
   wherein the reference display for correction is a bar image display with reference to which the image is corrected against the inclination and/or the vertical displacement caused by terrestrial magnetism, and wherein the correction of the image against the inclination and/or the vertical displacement caused by the terrestrial magnetism is performed after an image size on the screen of said cathode ray tube is adjusted so that the image is displayed entirely with a uniform compression ratio.

* * * * *